United States Patent [19]

Baron

[11] Patent Number: 5,678,271
[45] Date of Patent: Oct. 21, 1997

[54] SELF-PROPELLED SURFACE CONDITIONING APPARATUS AND METHOD

[76] Inventor: Stephen Lee Baron, 207 Mission St., Santa Cruz, Calif. 95060

[21] Appl. No.: 516,880

[22] Filed: Aug. 18, 1995

[51] Int. Cl.[6] .............................. B63B 59/00; B62D 57/00
[52] U.S. Cl. ........................ 15/1.7; 15/49.1; 15/340.1; 15/98; 180/7.1
[58] Field of Search ........................ 15/1.7, 49.1, 98, 15/340.1; 180/7.1

[56] References Cited

U.S. PATENT DOCUMENTS

| | | |
|---|---|---|
| 1,135,491 | 4/1915 | Baukin . |
| 3,148,487 | 9/1964 | Fildes . |
| 3,262,329 | 7/1966 | Hermann . |
| 3,360,223 | 12/1967 | Mattem . |
| 3,608,108 | 6/1971 | Sawyer . |
| 3,609,787 | 10/1971 | Aurelio et al. . |
| 3,629,893 | 12/1971 | Brown . |
| 3,832,080 | 8/1974 | Stoecker . |
| 3,864,784 | 2/1975 | Kilstrom et al. . |
| 3,883,260 | 5/1975 | Heckner . |
| 3,914,820 | 10/1975 | Hankel . |
| 3,928,202 | 12/1975 | Raubenheimer ................... 15/1.7 |
| 3,972,637 | 8/1976 | Sutherland . |
| 4,454,627 | 6/1984 | Simm et al. . |
| 4,682,558 | 7/1987 | Broersz ............................ 15/1.7 |
| 4,771,645 | 9/1988 | Persson . |
| 4,775,263 | 10/1988 | Persson et al. . |
| 4,784,006 | 11/1988 | Kethley ........................... 180/7.1 |
| 5,016,313 | 5/1991 | Yonehara . |
| 5,293,659 | 3/1994 | Rief .................................. 15/1.7 |
| 5,404,607 | 4/1995 | Sebor ............................... 15/1.7 |
| 5,428,854 | 7/1995 | Rief .................................. 15/1.7 |
| 5,450,645 | 9/1995 | Atkins ............................... 15/1.7 |

FOREIGN PATENT DOCUMENTS 768690  10/1980  U.S.S.R. ......................... 180/7.1

*Primary Examiner*—David Scherbel
*Assistant Examiner*—Randall Chin
*Attorney, Agent, or Firm*—Flehr, Hohbach, Test, Albritton, & Herbert LLP

[57] ABSTRACT

A surface conditioning assembly and method is disclosed. The conditioning assembly includes a frame support, a vibration generating apparatus for moving the frame support relative to the surface, at least one guide member for guiding the frame support as the support is moved relative to the surface, and a surface conditioning material mounted to the frame support for conditioning the surface. The method includes the steps of positioning a conditioning assembly on the surface, operating the vibration generating apparatus to apply vibrational forces to the conditioning assembly to urge the guide member against the track structure and move the conditioning assembly relative to the surface, and conditioning the surface with a surface conditioning material carried by the conditioning assembly.

14 Claims, 4 Drawing Sheets

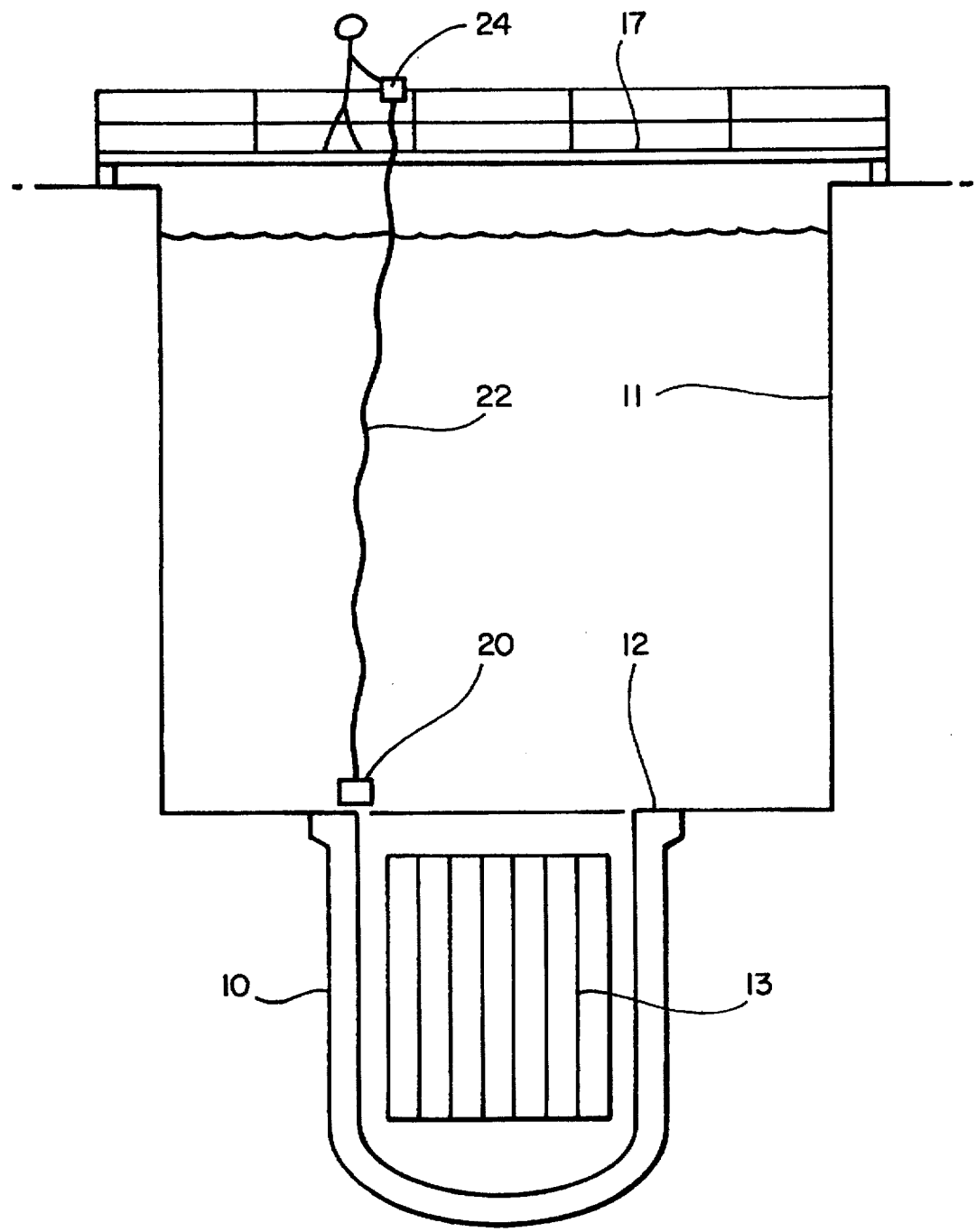
FIG_1

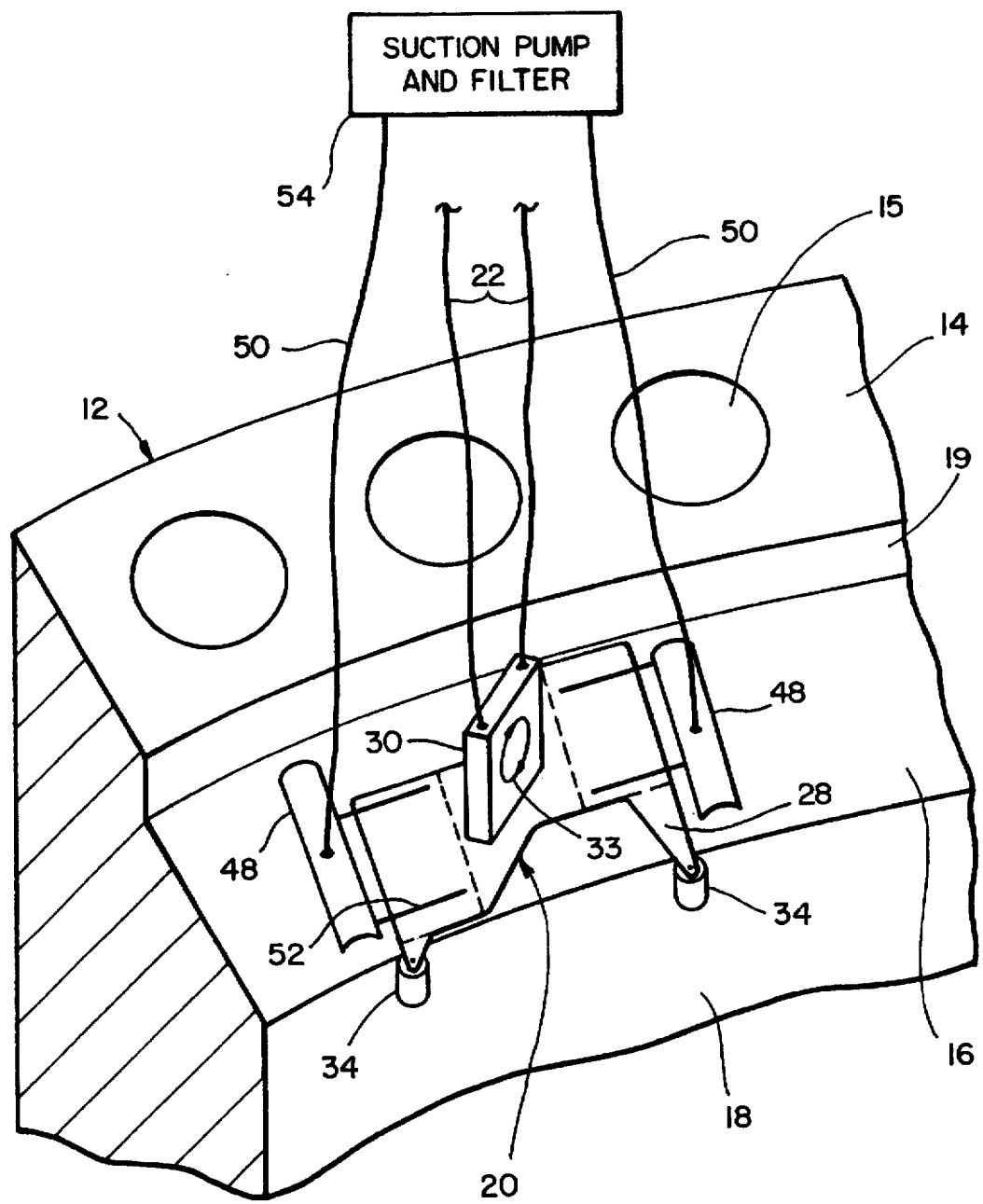
FIG_2

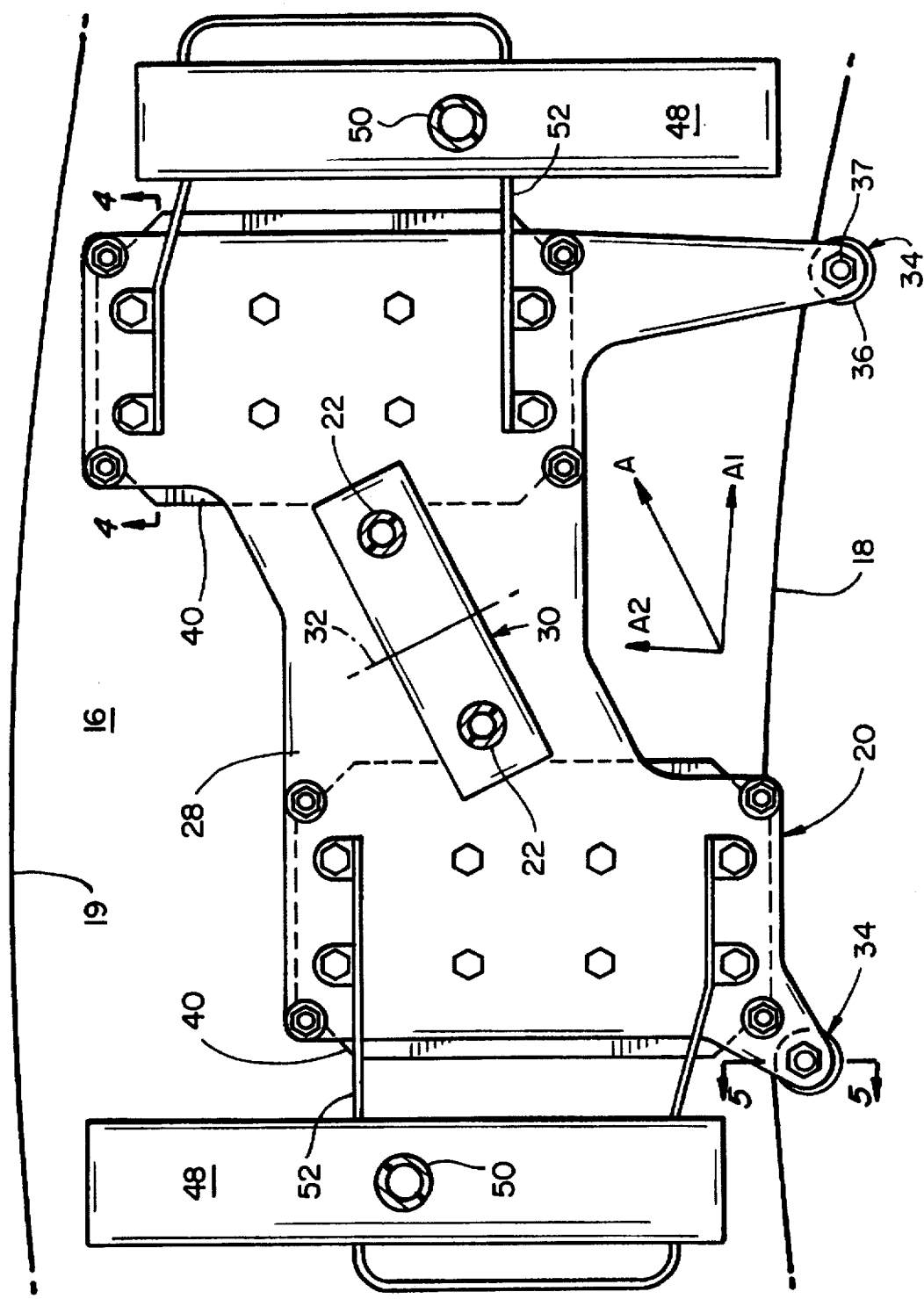
FIG_3

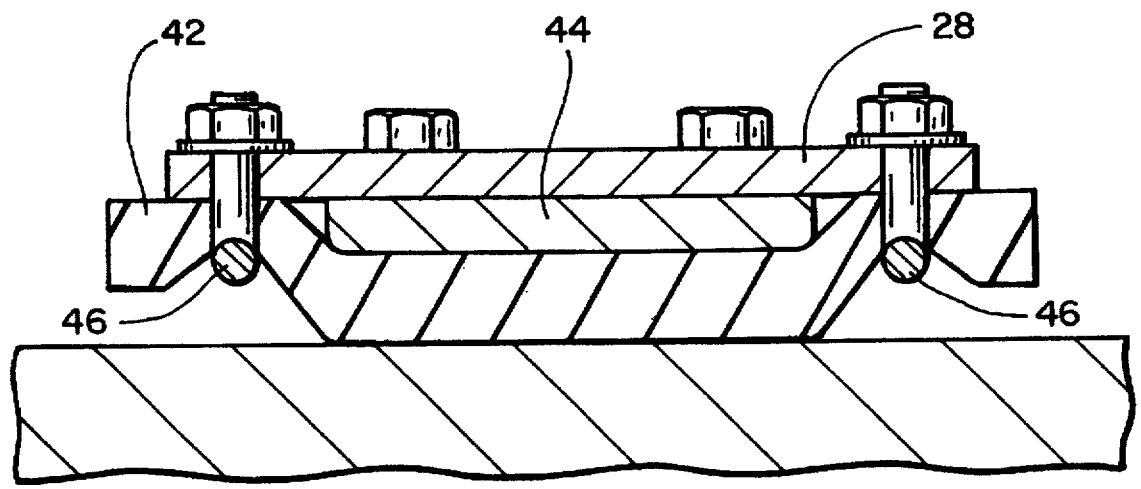
FIG_4
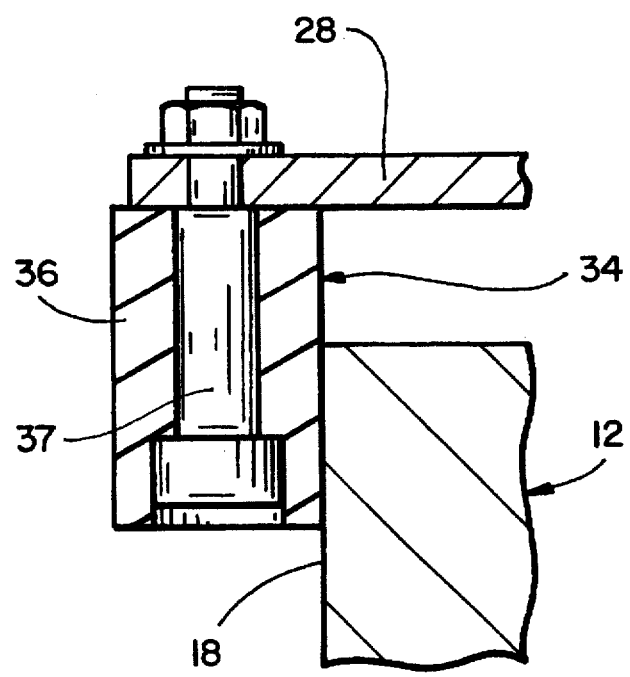
FIG_5

1

SELF-PROPELLED SURFACE CONDITIONING APPARATUS AND METHOD

BRIEF DESCRIPTION OF THE INVENTION

The present invention relates in general to a self-propelled apparatus and, more particularly, to a self-propelled system for conditioning a surface.

BACKGROUND OF THE INVENTION

Devices which are partially or entirely self-propelled have been used in a variety of applications. Surface conditioning devices are often self-propelled, with the weight and automatic motion of the devices facilitating the conditioning process. For example, self-propelled devices have been employed for tamping or compacting soil, paving materials and the like. U.S. Pat. Nos. 3,262,329, 3,360,223, 3,832,080, 3,883,260, 3,972,637, 4,771,645 and 4,775,263 disclose examples of such self-propelled compacting devices. The disclosed compacting devices are propelled by vibratory forces created by the rotation of an eccentric weight and include various means for reversing the direction of travel. Although the devices are self-propelled, the disclosed compacting devices must be manually guided as they move across the surface. A machine which may be moved across a desired surface without being manually guided is desirable.

Various machines for sanding, cleaning or polishing a surface use eccentric vibrational forces. U.S. Pat. Nos. 3,609,787 and 5,016,313 disclose examples of cleaning machines which use vibrational forces to condition the surface and to facilitate movement of the cleaning machine as the operator pushes the machine across the surface. Other surface conditioning machines include an oscillating or reciprocating abrasive pad for cleaning or conditioning a surface. U.S. Pat. Nos. 3,629,893, 3,864,784 and 3,914,820 disclose examples of devices which utilize vibrational forces to oscillate an abrasive pad. The oscillating pad cleans or conditions the surface as the device is moved across the surface by an operator. The disclosed devices are guided by the operator. A surface conditioning machine which is self-propelled and self-guided across a surface is desirable.

A self-propelled cleaning machine has been used to periodically clean the flanges of a nuclear power plant reactor vessel after the refueling cavity has been drained. Reversible, powered rollers are used to drive the machine around the flange surface while guide rollers engage the edge of the flange and guide the machine around the flange. The surface is cleaned by rotating brushes, with the debris being removed by suction or vacuum devices. A machine which uses oscillating or reciprocating motion to clean the flanges of a reactor vessel is desirable. A self-propelled, self-guided machine which may be used to clean the flanges of the reactor vessel while the reactor cavity is flooded with water or another liquid is highly desirable.

OBJECTS AND SUMMARY OF THE INVENTION

It is a primary object of this invention to provide a self-propelled, self-guided machine for conditioning a surface.

It is a further object of this invention to provide a self-guided assembly which is propelled across a surface by vibrational forces.

It is another object of this invention to provide a self-propelled, self-guided assembly for conditioning the flanges of a nuclear reactor vessel.

It is yet another object of this invention to provide an assembly for conditioning the flanges of a nuclear reactor vessel which is submerged in a body of liquid.

It is still another object of this invention to provide a surface conditioning assembly which employs oscillating motion to clean the surfaces of a nuclear reactor vessel.

A more general object of this invention is to provide a self-propelled, self-guided surface conditioning assembly which may be economically manufactured, conveniently employed, and efficiently and reliably maintained.

In summary, this invention provides a surface conditioning assembly which is self-propelled and self-guided. The assembly includes a frame support movably supportable on a surface which requires conditioning, a vibration generating apparatus coupled to the frame support, and at least one guide member carried by the frame support. The vibration generating apparatus applies vibrational forces to the support to move the frame support relative to the support surface. The vibration generating apparatus moves the support in a predetermined direction relative to the surface, urging the guide member against a track structure associated with the surface. The guide member cooperates with the track structure to guide the frame support as it is moved relative to the surface. A surface conditioning material is mounted to the frame support and positioned to engage the surface when the frame support is moved relative to the surface.

Additional objects and features of the invention will be more readily apparent from the following detailed description and appended claims when taken in conjunction with the drawings.

BRIEF DESCRIPTION OF THE DRAWINGS

FIG. 1 is a schematic side elevational view of a surface conditioning assembly in accordance with the invention, shown conditioning the flange of a reactor vessel.

FIG. 2 is a schematic, isometric view of the surface conditioning assembly of FIG. 1, shown conditioning the flange of a reactor vessel.

FIG. 3 is top plan view of the surface conditioning assembly of FIG. 1.

FIG. 4 is a cross sectional view taken substantially along line 4—4 in FIG. 3.

FIG. 5 is a cross sectional view taken substantially along line 5—5 in FIG. 3.

DETAILED DESCRIPTION OF THE INVENTION

Reference will now be made in detail to the preferred embodiment of the invention, which is illustrated in the accompanying figures. Turning now to the drawings, wherein like components are designated by like reference numerals throughout the various figures, attention is directed to FIGS. 1 and 2.

FIGS. 1 and 2 schematically illustrate one application of a surface conditioning assembly 20 incorporating this invention. As is shown particularly in FIG. 1, the reactor vessel 10 of a light-water nuclear reactor is typically located at the bottom of a refueling cavity 11. In the condition illustrated in FIG. 1, the vessel head or cover (not shown) has been removed for refueling and the cavity 11 is flooded with a suitable liquid to provide a protective barrier between the reactor core and the surrounding environment. The reactor vessel 10 includes a circumferentially extending flange 12 and holds the fuel rods 13. Although not shown, the reactor vessel head or cover is mounted to the flange 12 to safely contain the fuel rods within the reactor vessel. As is shown in FIG. 2, flange 12 typically has a stepped configuration which includes a raised outer stretch 14 formed with a plurality of stud holes 15 for securing the cover to vessel 10 and a lower inner stretch 16 for supporting sealing o-rings or other sealing members. The sealing surface of the inner stretch 16 is preferably formed of a material such as polished stainless steel for obtaining a secure seal between the vessel 10, o-rings and vessel head, while the outer stretch 14 may be formed of other materials such as carbon steel. The reactor vessel must be regularly maintained by cleaning or conditioning vessel surfaces such as the surfaces of flange 12 and the mating surfaces of the vessel head.

With prior art cleaning machines, the refueling cavity 11 must be drained to effectively clean flange 12 of the reactor vessel, increasing the exposure of personnel to radioactive contamination and radiation from the reactor. The conditioning assembly 20 of the present invention may be used to clean or condition the flange 12 while the refueling cavity 11 is flooded with water or other suitable liquid. The water provides a protective barrier between the operator standing on the refueling bridge platform 17 and the radioactive components of the reactor vessel 10. Isolating the operator from the flange area substantially eliminates any risk of exposure to airborne contaminants, significantly increasing operator safety.

In the present embodiment, in which conditioning assembly 20 may be used to condition a surface while submerged in a liquid, the conditioning assembly is pneumatically operated using control hoses 22 and a control panel 24 situated on the refueling bridge 17. The operator uses the control panel 24 to initiate and discontinue operation of the conditioning assembly. The hoses 22 may also be used to lower the conditioning assembly onto flange 12 and locate the assembly 20 in the desired starting position on either the outer stretch 14 or the inner stretch 16 of the flange.

Turning to FIGS. 2–5, the surface conditioning assembly 20 will be described in greater detail. Conditioning assembly 20 generally includes a frame support 28 which is movable across a surface by a vibration generating apparatus 30. In the present embodiment, vibration generating apparatus 30 is a rotary vibrator of the type which employs one or more rotating eccentric weights to produce orbital vibrational forces. By rotating the weights about an eccentric axis 32 (FIG. 3) in the direction of the arrows 33 in FIG. 2, the vibration generating apparatus 30 cyclically produces upward directed forces horizontal, force in the forward direction of arrow A, and downward directed forces. These vibrational forces tend to lift the frame support 28, move the frame support forward in the direction of arrow A and push the frame support downwardly against the surface of flange 12. In the present embodiment, a single eccentric weight is used, although in other embodiments of the invention the apparatus 30 may use two or more eccentric weights if desired. Moreover, other means may be used to produce the rotational vibratory forces in accordance with the present invention. However, a vibrator which produces reciprocating, linear forces would generally be unsuitable for propelling frame support 28 across a surface.

In the present embodiment, vibration generating apparatus 30 is an air-powered turbine vibrator which operates on 100 psi station air. Air is supplied to the apparatus 30 through one of the hoses 22, with the other hose removing exhaust from the apparatus 30. With the air-powered vibration generating apparatus 30, conditioning assembly 20 is particularly suitable for cleaning or conditioning a surface such as flange 12 submerged under water. However, the conditioning assembly 20 may also be used to condition surfaces located in a gaseous environment. Moreover, it should be understood that in other embodiments of the invention an electrically or hydraulically powered vibration generating apparatus may be used.

Surface conditioning assembly 20 includes means for guiding the assembly 20 as it is moved across a surface. One such guiding means is provided by guide members 34 carried by the frame support 28. In the present embodiment, guide members 34 are mounted to the underside of the frame support along one side of the support 28. In the position shown in FIG. 2, the guide members 34 contact the inner peripheral edge 18 of the inner stretch 16 of flange 12 and cooperate with the vibration generating apparatus to guide the conditioning assembly 20 as it moves around the flange. As is discussed below, edge 18 provides a track surface which may be used by the guide members 34 to guide the conditioning assembly 20.

As is shown in FIG. 3, vibration generating apparatus 30 is positioned with the eccentric axis 32 oriented at an angle relative to the guide members 34 so that the horizontal motion produced by the vibrational forces is in the direction of arrow A. The motion induced by the apparatus 30 biases or urges the guide members 34 against the peripheral edge 18. In the preferred form of the invention, the engagement between the peripheral edge 18 and the guide members 34 is obtained by urging the guide members against the edge 18, the guide members 34 are not coupled or hooked to the peripheral edge of the flange. Using the motion of the vibration generating apparatus to maintain the engagement between the guide members 34 and the peripheral edge 18 is of particular advantage where the inner edge of the flange has a generally flat, uninterrupted surface as is shown in FIG. 2. The cleaning machine 20 may be used to condition a variety of surfaces since the use of the guide members is not limited to surfaces having a specific track surface associated with the surface to be conditioned. Moreover, operation of the cleaning assembly 20 is simplified since the guide members 34 are not hooked onto or coupled to the track surface provided by inner edge 18.

As is shown in FIG. 3, the horizontal motion indicated by arrow A has a first component, indicated by arrow A1, parallel to the engaged portion of peripheral edge 18 and a second component, indicated by arrow A2, perpendicular to the peripheral edge 18. The vibrational forces in the direction of arrow A2 urge the guide members 34 against the peripheral edge 18 and ensure that the guide members are held against the peripheral edge 18 of the flange, substantially preventing any movement of the conditioning assembly in the direction of arrow A2. The first component A2 of horizontal motion induced by the vibration generating apparatus moves the frame support 28 around the inner stretch 16 of the flange 12.

The horizontal motion induced by the vibration generating apparatus 30 moves the cleaning assembly 20 relative to the surface of the inner stretch 16 of the flange and urges the guide members against the peripheral edge to maintain the engagement between the members 34 and the edge 18. The upward and downward directed forces created by the vibration generating apparatus move the frame support upwardly and downwardly relative to the flange to clean the flange surface. With vibration generating apparatus 30, the cleaning assembly 20 of the present invention is a self-propelled, self-guided system.

For optimum efficiency, vibration generating assembly 30 is preferably oriented so that the force component in the direction of arrow A2 applies the minimum amount of force required to retain the guiding members 34 in engagement with the peripheral edge 18 of the flange. This maximizes the magnitude of the vibrational force component in the direction of arrow A1 which propels the surface conditioning assembly across the surface of the flange. In the present embodiment, the eccentric axis 32 is oriented at an angle of 55° to 65° relative to the guide members 34 and the engaged portion of the peripheral edge 18, although it is to be understood that the apparatus 30 may be oriented at other angles relative to guide members 34 if desired.

With the reactor vessel 10 shown schematically in FIGS. 1 and 2, the surface conditioning assembly 20 may be used to clean either the outer stretch 14 or the inner stretch 16, with the guide members 34 positioned to engage the inner peripheral edge 18 of the inner stretch 16 or the inner peripheral edge 19 of the outer stretch 14. In the present application, the cleaning assembly 20 may not be positioned with the guide members 34 contacting the outer peripheral edge of the flange because the outer stretch of the flange 12 is flush with the floor of the refueling cavity 11 as is shown schematically in FIG. 1. However, if the outer stretch of the flange 12 is vertically spaced from the floor of the cavity 11, it is to be understood that the cleaning assembly 20 may be positioned with the guide members 34 urged against the outer peripheral edge of the flange. The guide members 34 cooperate with the track surface provided by the inner peripheral edges of the stretch of the flange being cleaned to guide the surface conditioning assembly as the assembly 20 is moved relative to the surface of the flange. In the illustrated application, by the object itself provides the track surface in the form of the inner peripheral edges of the flange. However, in other applications of the invention the track surface may be provided by a separate fixture (not shown). For example, a fixture may be temporarily secured in place with a track surface such as a rail, frame rod, cable, rope or the like (not shown) positioned on or spaced from the surface to be conditioned. The guide members would be positioned to be moved into engagement with the track surface by the vibration generating apparatus 30 and guide the conditioning assembly relative to the surface in a predetermined path.

In the present embodiment, guide members 34 are provided by a guide sleeve 36 mounted to frame support by bolt 37. If desired, sleeves 36 may be rotatably mounted to the frame support. Preferably, guide sleeve 36 is formed of a resilient material such as a urethane rubber to minimize wear. However, the configuration of guide members 34 is subject to considerable variation provided the guide members are shaped to be urged against the track surface associated with the surface which requires conditioning. Although two guide members 34 are shown in the present embodiment, it is to be understood that the number may be increased or decreased as desired. The position of the guide members on the frame support 28 may also be varied in other embodiments of the invention.

In the present embodiment, surface conditioning assembly 20 includes a surface conditioning material such as conditioning pads 40 mounted to the underside of frame support 28. Pads 40 include a layer 42 of conditioning material overlaying a support block 44 mounted to the frame support 28. The conditioning layer 42 is secured in place by a pair of longitudinally extending clamping bars 46. The pads 40 condition the surface as the support 28 is cyclically moved upward, forward in the direction of arrow A1, and downward against the flange surface as described above. As is shown in FIG. 2, frame support 28 includes two conditioning pads 40 which are sized and positioned to effectively cover the entire width of the inner stretch 16 of the flange. If desired, conditioning pads 40 may be configured to cover a greater or lesser area of the frame support. Several pads 40 or a single pad covering a portion or the entire underside of frame support 28 may be used.

The characteristics of conditioning pads 40 will depend upon the type of surface conditioning required. Examples of conditioning processes with which assembly 20 may be used include cleaning, abrading, scrubbing, sanding, polishing, buffing, tamping and compacting. The inner stretch 16 of the flange 12 must be periodically cleaned and conditioned to remove accumulated scale and debris so that an effective seal may be consistently obtained at the juncture of the vessel 10, the o-rings, and the vessel head. For this application, conditioning pads 40 are preferably formed of a fine material suitable for polishing the sealing surface of flange 16. The outer stretch of the flange 12, which rusts rapidly when submerged, must be periodically cleaned to remove accumulated rust and other debris to avoid the spread of loose rust particles to the sealing surface of the inner stretch 16 or into the open reactor vessel 10. The removal of rust particles from the outer stretch 14 is essential as the o-ring seals and other threaded fasteners and mechanisms are potentially contaminated by rust particles. Moreover, the rust may become radioactive if allowed to settle in the reactor fuel core. Conditioning pads 40 used to clean the surface of the outer stretch 14 are preferably formed of a coarse material suitable for abrasively scrubbing the flange surface to loosen the rust material while resisting accumulation of the loosened material in the pads. However, it will be understood with other surfaces and other conditioning processes, a wide variety of surface conditioning materials may be selected including for example fine cleaning materials, sanding blocks, buffing pads, polishing pads, bristles, or substantially rigid plates suitable for tamping or compacting the surface. If desired, the rigid tamping or compacting plate may be integrally or monolithically formed with the frame support 28. By interchanging conditioning pads 40 of different materials, assembly 20 may be used to attain the desired surface finish.

Surface conditioning assembly 20 preferably includes at least one suction device 48 for collecting debris or other loose material from the surface conditioned by assembly 20. As is shown in FIG. 2, in the present embodiment surface conditioning assembly 20 includes one suction device 48 in front of the frame support 28 for removing loose particles from the path of the conditioning pads 40. A second suction device 48 positioned to the rear of the frame support 28 collects particles loosened from the surface by the conditioning pads. The suction devices 48 preferably extend the entire width of the conditioning pads 40, but suction devices having a shorter or greater length are within the scope of the present invention. Moreover, a greater number of suction devices may be employed if desired. In the present embodiment, suction devices 48 are secured to frame support 28 by cables 52 and coupled to hoses 50 which extend from the devices 48 to a suction pump and filter 54. The suction pump and filter may be located under water or above the surface of the water within the refueling cavity 11. While the use of suction devices 48 is preferred when loose particles will be produced during the conditioning process, it is to be understood that in other applications of the invention suction devices 48 may be unnecessary.

As is apparent from the foregoing description, the surface conditioning system of this invention may be used to effectively condition a wide variety of surfaces. The surface conditioning assembly 20 is positioned on a surface with the guide members 34 positioned to be moved against the track surface associated with the surface, such as the peripheral edge 18 in the illustrated application. For conditioning reactor vessels, an operator uses hoses 22 or other suitable means to lower the conditioning assembly 20 onto the surface of inner stretch 16 with the guide members 34 depending from the inner stretch 16 on the side of peripheral edge 18. The cleaning assembly 20 is activated, with vibration generating apparatus moving the guide members 34 against the peripheral edge 18. However, the guide members 34 may be aligned with the peripheral edge 18 prior to initiating operation of the cleaning assembly if desired. When the guide members 34 engage the edge 18, the vibration generating apparatus moves the cleaning assembly around the inner stretch 16 of the flange. Preferably, the flange 12 is cleaned by submerging conditioning assembly 20 in the water retained in refueling cavity 11.

The operator activates the vibration generating apparatus 30, which generates vibrational forces to propel the conditioning assembly 20 across the flange surface. Guide members 34 cooperate with the track surface provided by peripheral edge 18 to guide the conditioning assembly 20 along the flange. Aside from ensuring the hoses 22 and 50 do not become tangled with objects extending above the flange 12, no further adjustment of the position of conditioning assembly 20 will be required. The suction devices 48 remove loose particles and debris as the conditioning assembly is moved along the flange surface. After inner stretch 16 has been cleaned, the operator may move the conditioning assembly to outer stretch 14 and repeat the conditioning process to clean the outer stretch of the flange 12.

It is to be understood that in this description and the appended claims, the term "conditioning" includes, but is not limited to, cleaning, abrading, scrubbing, sanding, polishing, buffing, tamping and compacting. The present invention provides a self-propelled, self-guided machine which is particularly suitable for conditioning a surface. The actual surface conditioning material employed will depend upon the type of surface treatment selected and the characteristics of the surface which requires conditioning.

What is claimed is:

1. In a vessel having a selected surface to be conditioned, the selected surface defining a plane, a track surface associated with said selected surface, the track surface being oriented at an angle to the plane of the selected surface, and a self-propelled, self-guided assembly for conditioning the selected surface, said assembly comprising:

a frame support movably supportable on the selected surface, at least one guide member carried by said frame support, said guide member engaging the track surface when said frame support is supported on the selected surface to guide said frame support as said frame support is moved relative to the selected surface, a vibration generating apparatus coupled to said frame support, said vibration generating apparatus applying vibrational forces to said frame support to move said frame support in a predetermined direction relative to the selected surface, said predetermined direction having a first component and a second component perpendicular to said first component, said vibration generating apparatus urging said guide member against the track surface when said frame support is moved in said first component of said predetermined direction and said vibration generating apparatus moving said frame support relative to the selected surface when said frame support is moved in said second component of said predetermined direction.

2. The assembly of claim 1, and further comprising a surface conditioning material mounted to said frame support, said surface conditioning material conditioning the selected surface as said frame support is moved relative to the selected surface.

3. The assembly of claim 1, and further comprising at least one collection device for removing debris from the selected surface.

4. The assembly of claim 1 in which said guide member is configured to substantially restrain movement of said frame support in a direction perpendicular to the portion of said track surface engaged by said guide member.

5. The assembly of claim 1 in which said vibration generating apparatus is configured for operation in liquid.

6. In a vessel having a selected surface to be conditioned, the selected surface defining a plane, a track surface associated with said selected surface, the track surface being oriented at an angle to the plane of the selected surface, and a self-propelled, self-guided assembly for conditioning the selected surface, said assembly comprising:

a frame support;

at least one guide member carried by said frame support, said guide member engaging the track surface when said frame support is positioned on the selected surface to guide said frame support as said frame support is moved relative to the selected surface;

a vibration generating apparatus coupled to said frame support, said vibration generating apparatus applying vibrational forces to said frame support to bias said guide member against the track surface and move said frame support relative to the selected surface; and a surface conditioning material mounted to said frame support and positioned to engage the selected surface when said frame support is moved relative to the selected surface.

7. The assembly of claim 6 in which said vibration generating apparatus is configured to apply vibrational forces moving said frame support in a direction perpendicular to the selected surface for conditioning the selected surface.

8. The assembly of claim 6 in which said vibration generating apparatus is configured to move said frame support in a predetermined direction having a first component and a second component perpendicular to said first component, said guide member restraining movement of said frame support in said first component of said predetermined direction to guide said frame support in said second component of said predetermined direction.

9. The assembly of claim 6 in which said vibration generating apparatus is pneumatically operated.

10. The assembly of claim 6 in which the selected surface is located beneath a layer of liquid and in which said vibration generating apparatus is configured for operation when said vibration generating apparatus is submerged in said liquid.

11. The assembly of claim 6 in which said guide member is configured to restrain movement of said frame support in a direction substantially perpendicular to the portion of said track surface engaged by said guide member.

12. In combination, the assembly of claim 6 and an object having a selected surface to be conditioned, the selected surface terminating in a peripheral edge which defines a track surface, said guide member engaging said peripheral edge of said selected surface to guide said frame support as said frame support is moved relative to said selected surface.

13. The assembly of claim 6 in which said surface conditioning material is an abrasive material configured for cleaning the selected surface.

14. The assembly of claim 6, and further comprising at least one collection device for removing debris from the selected surface as said frame support is moved relative to the selected surface.

* * * * *

UNITED STATES PATENT AND TRADEMARK OFFICE
CERTIFICATE OF CORRECTION

PATENT NO. : 5,678,271
DATED : October 21, 1997
INVENTOR(S) : Stephen Lee Baron

It is certified that error appears in the above-indentified patent and that said Letters Patent is hereby corrected as shown below:

Column 1 of the title page, under "References Cited", "Hermann" should be replaced by --Herrmann--.

Column 2, line 6, change "dean" to --clean--.

Column 3, line 48, "upward directed forces horizontal, force" should read --upward directed forces, horizontal forces--.

Column 4, line 51, "The first component A2 of" should read --The first component A1 of--.

Column 5, line 30, "illustrated application, by the object" should read --illustrated application, the object--.

Column 6, line 13, change "pa&" to -- pads --.

Signed and Sealed this

Third Day of March, 1998

Attest:

BRUCE LEHMAN

*Attesting Officer*    *Commissioner of Patents and Trademarks*